Nov. 10, 1964   E. G. LUNDGREN   3,156,032
CUTTING INSERT AND TOOL HOLDER THEREFOR
Filed March 21, 1963   4 Sheets-Sheet 1

INVENTOR
Evert Gustav Lundgren
BY Pierce, Scheffler & Parker
ATTORNEYS

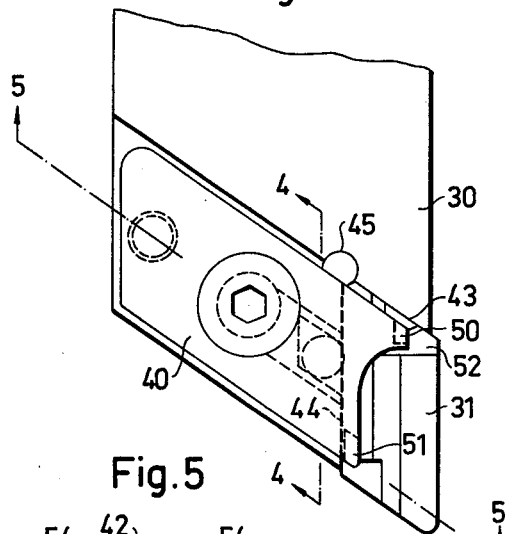
Fig. 3
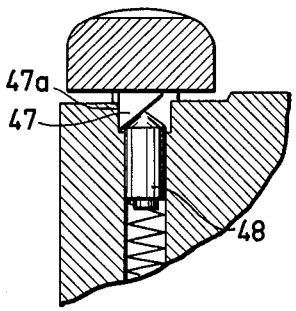
Fig. 4
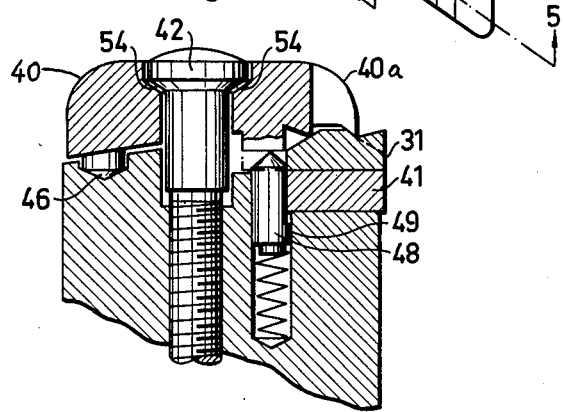
Fig. 5
Fig. 6
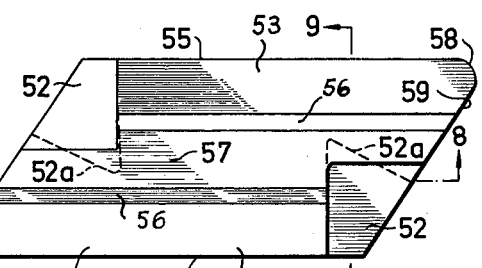
Fig. 7
INVENTOR
Evert Gustav Lundgren
BY Pierce, Scheffler + Parker
ATTORNEYS

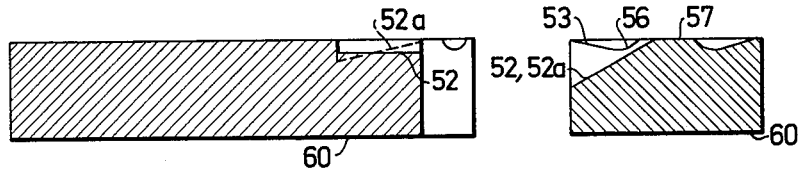
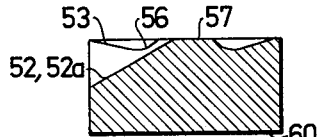
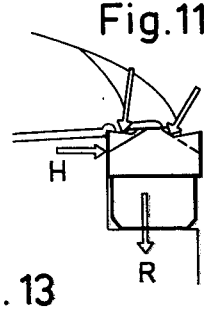
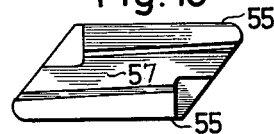
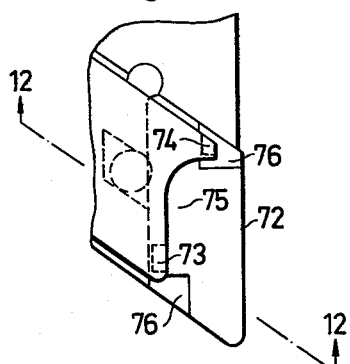
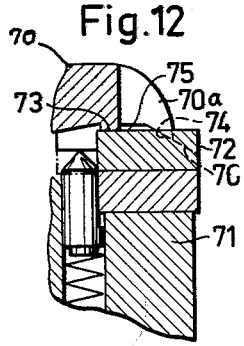
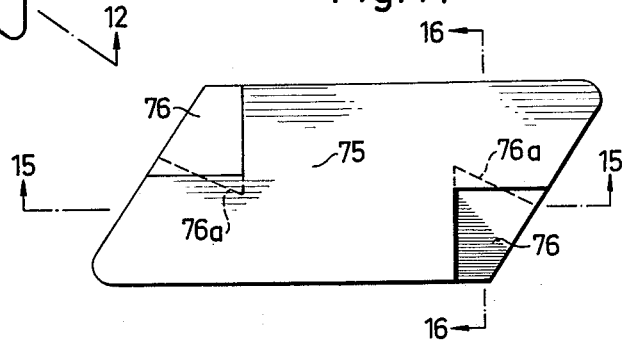

Nov. 10, 1964  E. G. LUNDGREN  3,156,032
CUTTING INSERT AND TOOL HOLDER THEREFOR
Filed March 21, 1963  4 Sheets-Sheet 4

INVENTOR
Evert Gustav Lundgren
BY Pierce, Scheffler & Parker
ATTORNEYS

United States Patent Office 3,156,032
Patented Nov. 10, 1964

3,156,032
CUTTING INSERT AND TOOL HOLDER
THEREFOR
Evert Gustav Lundgren, Sandviken, Sweden, assignor to
Sandvikens Jernverks Aktiebolag, Sandviken, Sweden,
a corporation of Sweden
Filed Mar. 21, 1963, Ser. No. 266,994
Claims priority, application Sweden, Mar. 23, 1962,
3261/62
11 Claims. (Cl. 29—96)

The present invention relates to a cutting insert for a tool holder having a support surface for the underside of the insert and side support surfaces for two supportable side surfaces of the insert said insert having a cutting corner between two adjacent side surfaces and two clamp contact surfaces arranged in spaced relation to each other on the top surface.

Tool holders and inserts of this kind should be built in such a way that in use the cutting force urges the cutting insert into the insert site towards the side support surfaces, which means that the only function of the clamping device is to hold the insert when the cutting forces are not acting upon it. For certain types of work, especially copy turning, it happens, however, that the direction of the cutting force varies so much—in certain cases up to as much as 200°—that it is impossible to comply with the desiderate that the force always urges the insert inwardly against the side supporting surfaces of the holder. This means that the insert in certain positions may be pulled or turned from its correct position if the clamping device is unable to hold it securely. Practical experience has shown that the friction between the insert and the support surface alone is often insufficient to hold the insert securely.

One of the objects of the invention is to provide a construction in which sufficient resistance forces are created to hold the insert against movement.

According to the present invention there is provided an arrangement for securing a cutting insert in a tool holder with a clamping device which consists in providing a surface of the insert with at least one inclined surface, the direction of inclination being such that the clamping force on said contact surface has a component opposed to the cutting force. The inclined contact surface may be provided on the upper surface of the insert in which case the arrangement restrains the clamping device against movement in the holder.

The invention further provides a cutting insert for a tool holder equipped with a clamping device said insert having on at least one face at least one inclined contact surface against which clamping pressure is adapted to be applied, the direction of inclination being such that the clamping force applied thereto has a component opposed to the cutting force to which the insert is to be subjected. Where the insert is adapted to be turned over said insert is provided with at least one inclined contact surface on each of two opposed faces.

The invention still further provides a tool holder for an insert according to the present invention wherein said tool holder is provided with means for restraining movement of the clamping device in said holder, the locking of the clamping device being essential where said clamping device bears on said inclined surface; otherwise the clamping device and the insert could both be moved together in the tool holder.

According to a preferred embodiment of the invention the insert is characterized in that one said clamp contact surface is near the end of one said adjacent side remote from the cutting corner where said adjacent side meets a supportable side surface on said insert and said contact surface is sloped down in the direction away from the other of the said supportable side surfaces.

The invention will now be described more fully with reference to the accompanying drawings wherein:

FIGS. 1 and 2 are sketches showing different types of work being done and the force components tending to displace the cutting insert from its correct position in the holder, FIGS. 3 to 6 show a tool holder made according to the invention, FIG. 3 being a plan view, FIGS. 4 and 5 being sections along the lines 4—4 and 5—5 in FIG. 3, and FIG. 6 being a fragmentary plan view.

FIGS. 7–9 show an insert for use with such tool holders, FIG. 7 being a plan view and FIGS. 8 and 9 being sections along the lines 8—8 and 9—9 in FIG. 7, FIG. 10 is a plan view of an alternative form of insert.

FIG. 11 is a sketch showing the distribution of the clamping forces.

FIGS. 12 and 13 show a tool holder with a modified insert in accordance with the invention clamped in the holder, FIG. 13 being a front elevational view and FIG. 12 showing a section along line 12—12 in FIG. 13.

Figure 15:
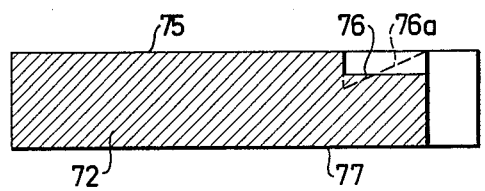
Figure 16:
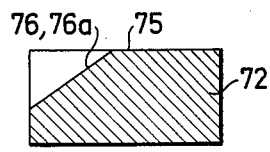

FIGS. 14–16 are enlarged detail views of the insert seen in FIGS. 12 and 13, FIG. 14 being a plan view and FIGS. 15 and 16 being sections along the lines 15—15 and 16—16 respectively in FIG. 14.

Figure 17:
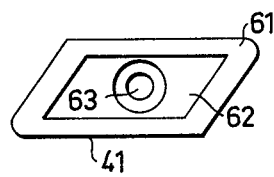
Figure 18:
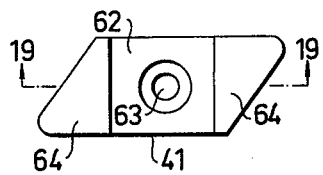
Figure 19:
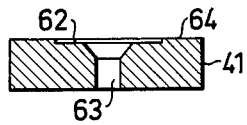

FIGS. 17 to 19 show the shim plate, seen in FIGS. 12 and 13, FIGS. 17 and 18 being top plan views and FIG. 19 being a section along the line 19—19 in FIG. 18.

Figure 1:
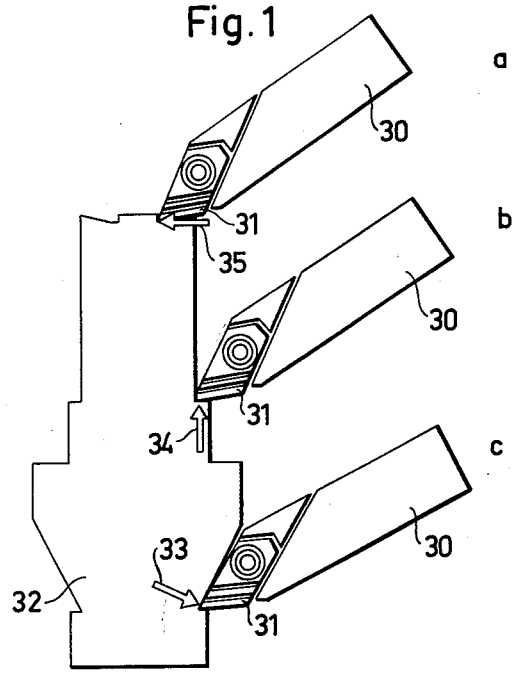
Figure 2:
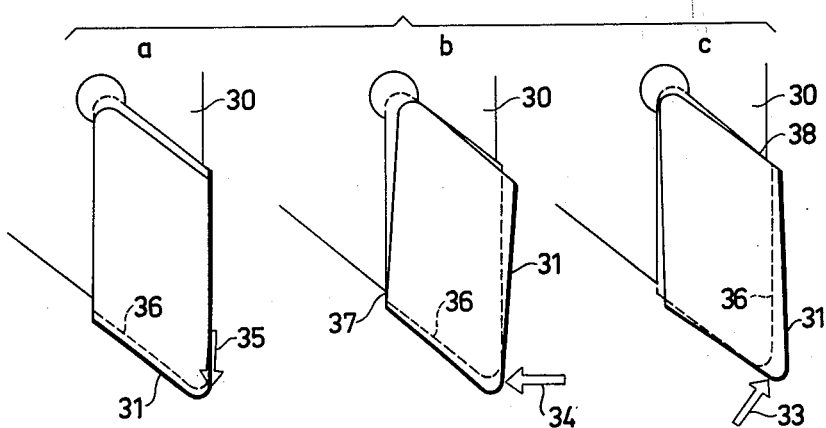

In FIG. 1 the cutter is shown carrying out a number of different operations in the copy turning of a work piece 32. The cutter in each case is moving in the reverse direction to the arrows 33, 34 and 35 respectively which therefore represent the component of the cutting force acting on a parallellogram type insert 31 clamped in a tool holder 30. FIG. 2 shows the cutting force components acting on the insert and the way in which the insert would be displaced in the insert site corresponding to the typical examples shown in FIG. 1. In a facing operation (FIGS. 1a and 2a) the cutting force component 35 tends to pull the insert along one side support surface out from the insert site. The correct position of the insert is indicated by the dotted line 36. In longitudinal turning (FIGS. 1b and 2b) the cutting force 34 tends to turn the insert around the corner 37. When turning tapering bodies with decreasing diameter (FIGS. 1c and 2c) the cutting force 33 may achieve such a direction that it tends to turn the insert 31 around the other corner 38 of the insert site.

FIGS. 3–6 show a tool holder intended for counteracting the above mentioned cutting force components as they tend to turn or pull the insert from its correct position. The tool holder 30 carries at one of its ends an insert 31 held fast by a clamping plate 40 and pressed against a shim plate 41 by a clamping screw 42. The insert 31 is positioned with two edge surfaces in contact with edge supporting surfaces 43 and 44 in the holder. Between the edge supporting surfaces at their intersection a bore 45 is made forming an undercut in order to give ample space for the corner of the insert 31. The clamping plate 40 is supported at its rear end by a pointed bearing 46 consisting of a pointed lug and a pointed recess. In this way the clamping plate is locked against movement perpendicularly to the axis of the pointed bearing. Closer to the insert site the clamping plate 40 is provided with a lug 47 which rests against a contact surface 47a on the holder shaft. This contact is maintained because the lug 47 is provided with an inclined surface which cooperates with an inclined surface on an axially movable pin 48 situated in the shaft of the holder 30. The pin is urged upwardly by a spring and urges thereby the lug 47 into contact with the contact surface 47a. The pin 48 is provided at its lower part with a lug 49 which protrudes under the plate 41 and prevents the pin 48 from being pressed out from its recess in the shaft of the holder 30 when the clamping plate 40 is raised.

The clamping plate 40 engages the insert 31 with two contact surfaces 50 and 51. The contact surface 50 on the lug 40a of the clamping plate 40 presses against an inclined contact surface 52 formed on the insert, which inclined contact surface is shaped with particular regard to the clamping of the insert 31. The contact surface 51 on the clamping plate 40 passes against the upper surface 53 of the insert 31. As can be seen from the broken lines representing the surfaces 50 and 51 in FIG. 3 these surfaces have a comparatively small area, because a three-point support is desired for the clamping plate 40, the three points being the pointed bearing 46 and the surfaces 50 and 51 respectively. In order to facilitate the self-adjustment of the clamping plate 40 to this three-point support the head of the clamping screw 42 rests against two raised minor projections 54 on the clamping plate 40 which are situated in line with the pointed bearing 46. In this way a two-point contact is achieved between the screw 42 and the plate 40 so that the latter can rock around the supporting projections 54, and the screw head does not restrain the necessary movement of the plate 40 for achieving the stable three-point support.

FIGS. 7–9 show in greater detail the insert 31 which at its upper surface is shaped as a chip breaker, said upper surface comprising portions 53 downwardly inclined from the side cutting edges 55 and curved upwardly closer to the central part forming upwardly inclined portions 56 terminating at a central portion 57, which in the embodiment shown is plane and situated at approximately the same level as the side cutting edges. The central portion 57 can alternatively have a rounded shape and be situated at another level than the side cutting edges. The side cutting edges 55 are connected by rounded portions 58 to the end cutting edges 59 situated at the short sides of the insert 31. As the insert 31 is symmetrical it can be turned through 180° around an axis perpendicular to its under surface 60. The insert 31 may also be formed without the central portion 57 and have inclined surfaces 53 only towards the middle.

The earlier mentioned surfaces 52 are intended to be support surfaces for the contact surface 50 of the clamping plate 40. As appears from FIG. 3 only the surface 52 which is situated adjacent the outer side cutting edge has contact with the clamping plate. The other surface 52 has no contact with the clamping plate 40, the contact surface 51 resting on an upper surface 53 of the insert. The upper surfaces 53 may be parallel with or inclined in relation to the under support surface 60 of the insert.

As appears from FIG. 9 the surfaces 52 may be inclined from the middle and downwardly towards the long sides of the insert but horizontal in the longitudinal direction of the insert (52 in FIG. 8). They may, however, also be inclined in the longitudinal direction from the short sides downwardly as is indicated by broken lines in FIGS. 7 and 8, in which case they assume another position marked 52a.

In use, by aid of the inclination of the surfaces 52 and the upper surfaces 53 of the insert, the clamping plate 40 will maintain an edge surface 55 of the insert 31 in contact with the edge supporting surface 44. If the surfaces 52 are also inclined to the position 52a the insert will be also maintained in contact with the other edge support surface 43. Even if the inclinations of the contact surfaces are smaller than the so-called self-locking angle, which means that the insert is not actively urged in the direction towards the edge supporting surfaces, the passive resistance against displacement from the edge supporting surfaces will nevertheless be very great. The inclination of the inclined surfaces 52 or 52a in the section shown in FIG. 9 should lie within the range 10°–60° in relation to the under surface 60 and preferably 20°– 30°. The inclination in the section shown in FIG. 8 should be 0–45°, preferably 10°–30°.

As the clamping plate is supported against sideward movement by the pointed bearing 46 and the abutting support 47 an effective and firm locking of the insert 31 in all directions without play will be achieved. The friction between the insert and the shim plate 41 and between the insert and the clamping plate contributes of course to the locking.

As appears from FIGS. 7–9 the inclined contact surfaces 52, 52a are comparatively small in relation to the rest of the insert 31, and it is of course desirable that they occupy as little space as possible along the sides which carry the cutting edges.

For the insert plate shown which has the shape of a parallelogram the angle of the cutting corners can be between 45° and 88°. It is of course also possible to give the insert a rhombic shape. Cutters of rectangular plan shape may be used, i.e. the corner angles being 90°. With suitable modification of the holder alternatively the insert may have more than four corners, in which case the cutting corner angle becomes obtuse. Inserts formed as a parallellogram have been found especially suitable for copy turning—a type of work where the present invention as earlier mentioned is especially useful.

In FIG. 10 an alternative embodiment of insert is shown where the portion 57 is oblique in relation to the cutting edges 55 in order to provide sufficient room for the contact surface 51 of the clamping plate for inserts where the chip breaker surfaces 53 and 56 have little width.

FIG. 11 shows how the resultant force R of the clamping forces is situated comparatively centrally in spite of the fact that the latter are obliquely directed. The horizontal component H is received by the side support surface. By placing the clamping forces symmetrically on both sides of the insert the resultant force R is brought closer to the middle of the supporting surface than for a one-sided position of the forces acting on the insert.

FIGS. 12 and 13 show an alternative embodiment of the insert and the clamping plate where the top of the insert is not shaped as in the earlier example with a chip breaker on its surface.

FIGS. 14–16 show an insert according to this last mentioned on a larger scale.

The holder shaft 71 (FIG. 12) is unchanged in comparison with the shaft 30. The clamping plate 70 differs from the clamping plate 40 in the shape of one of the small surfaces 73 and 74 which contact with the insert 72. As the top surface 75 of the insert is parallel with the under surface 77 the surface 73 must also be parallel with the under surface as distinguished from the surface 51 shown in FIGS. 3 and 5. The surface 74 shall as earlier shown have the same inclination as the inclined contact surface 76 against which it abuts. On analogy with the earlier described embodiment the inclined contact surfaces 76 can be either parallel with the surface of the insert in the longitudinal direction or inclined thereto as indicated by broken lines in FIGS. 14 and 15 showing an alternative position 76a for the inclined contact surfaces. In the section shown in FIG. 16 the surface 76 or 76a is always inclined. For the inclination angles the above statements about the surfaces 52 and 52a respectively are valid. This embodiment has been illustrated for an insert which in plan has the shape of a parallellogram, and the angle of the cutting corners may be 45°–88°.

In order to still more effectively prevent turning of the insert in relation to the shim plate and also achieve full certainty that the insert is well supported at the edges, the shim plate can be made with a raised ridge along the edge of the upper surface or several raised portions situated at the edge. A shim plate 41 (FIG. 17) is provided along its edge with a ridge 61. In the centre of the plate there is a hole 63 for a screw, a tubular pin or similar device for holding the plate on the tool holder. Between the screw hole 63 and the ridge 61 is a portion 62 which is somewhat lower than the ridge 61, which portion, as shown, suitably can be in the main plane. The ridge 61 is ground to a plane shape in the same way as the insert, by which means a good contact is achieved along the edges of the insert. If the shim plate had an unbroken plane top surface the contact between the underside of the insert and the top side of the shim plate might be concentrated to the centre of the contact surface because of tolerances in the finish of the surfaces causing a minor convexity, the result of which would be that the contact at the edge would be bad and the risk would arise of the insert being broken by the cutting forces. Moreover, a contact in the centre gives very small resistance against turning of the insert, so that the friction between the insert and the shim plate caused by the clamping force would in such case have a very small effect for preventing the turning of the insert. When the contact occurs along the peripherical ridge 61 the friction force has a long lever-arm, and the resistance against turning is as effective as it is possible to make it. In FIGS. 18 and 19 is shown an alternative embodiment of the shim plate where the ridge 61 is substituted by two raised portions 64. It is also possible to limit the raised portions to the areas closest to the corners of the insert, thereby achieving a support with four separate raised portions. A special advantage from one or more raised portions 61 or 64 is that only the said portions have to be accurately surface finished, while neither of the lower portions 62 between the screw hole 63 and the raised portion 61, and between the raised portions 64 require an accurate finish. It is of course also possible to provide the under side of the insert with raised portions at the periphery, said raised portions facing the shim plate, the shim plate being either plane or having corresponding raised portions.

If the shim plate is composed of several plates placed on top of each other, these may in order to prevent mutual turning and rocking have contact with each other and at the bottom also with the tool holder by similar raised peripheral portions on the plates and possibly also on the tool holder.

The invention has been described and illustrated above in connection with turnable inserts, i.e. inserts that can be turned around, and it can of course also be used for inserts which can be turned over end for end, in which case both sides of the inserts are provided with inclined contact surfaces in accordance with the invention. The invention can also be used for such inserts which are not turnable and have only one cutting corner. The described inserts are four-sided, but the invention can be applied also to triangular inserts or inserts having more than four sides.

The insert is usually made of sintered materials such as sintered carbide or ceramic oxides. Also the shim plate can be of such materials. The other parts of the tool holder are usually made of steel.

As appears from the examples above described the invention provides a substantial advantage in that inserts in the tool holder can be effectively held against displacement from their correct position in such working operations where such risk is involved in connection with hitherto known devices. This is of great importance for work of high accuracy as for instance in copy turning.

I claim:

1. A cutting insert having a bottom surface, a top surface, side surfaces between said bottom and top surfaces and corners at the junctures of adjacent side surfaces, a cutting edge along the intersection of at least one of said side surfaces and said top surface, one only of the two corners between which said one side surface extends being a cutting corner, a clamp contact surface constituting only a minor part of said top surface adjacent to the other of said two corners, said clamp contact surface being outwardly and downwardly inclined in relation to said bottom surface, and approaching said bottom surface in the direction toward said one side surface, said outwardly and downwardly inclined clamp contact surface having a length in the direction of said one side surface which is only a minor part of the length thereof, and another part of said top surface spaced from said outwardly and downwardly inclined clamp contact surface providing a second clamp contact surface.

2. A cutting insert as defined in claim 1 in which said outwardly and downwardly clamp contact surface approaches said bottom surface also in the direction towards said cutting corner.

3. A cutting insert as defined in claim 1 in which said outwardly and downwardly inclined clamp contact surface is a plane surface.

4. A cutting insert as defined in claim 1 in which a part of said top surface adjacent to said outwardly and downwardly inclined contact surface is formed as a chip breaker and is inclined inwardly away from said cutting edge and downwardly toward said bottom surface in the reverse direction to said outwardly and downwardly inclined clamp contact surface.

5. A cutting insert as defined in claim 1 comprising a second cutting edge along the intersection of said top surface and the other of the two side surfaces meeting at said one cutting corner.

6. A cutting insert as defined in claim 1 comprising at least two non-adjacent cutting edges along the intersections between said top surface and at least two non-adjacent side surfaces, each of said cutting edges terminating at one of its ends at a cutting corner and at the other of its ends at an outwardly and downwardly inclined clamp contact surface.

7. A cutting insert having a substantially plane rhombodial bottom surface, substantially plane side surfaces extending substantially perpendicularly from said bottom surface, a top surface joining said side surfaces, a cutting edge at the intersection of each long side surface with said top surface, a cutting corner at each acute angle corner, an outwardly and downwardly inclined clamp contact surface constituting only a minor part of said top surface adjacent to each obtuse angle corner, each outwardly and downwardly inclined clamp contact surface being inclined downwardly adjacent to one end of one cutting edge toward said bottom surface in the direction toward the adjacent long side surface, and a portion of said top surface adjacent to the other end of each cutting edge constituting a second clamp contact surface.

8. A cutting insert as defined in claim 7 in which said top surface besides said outwardly and downwardly inclined clamp contact surfaces adjacent the obtuse angle corners, comprises an inwardly and downwardly inclined surface extending away from each cutting edge toward the long axis of the insert and downwardly toward said bottom surface and a substantially plane surface parallel to said bottom surface and between the last named inclined surfaces.

9. A tool holder for a cutting insert comprising a holder shaft having an insert site therein, said insert site having a bottom surface and two side surfaces adapted to be engaged by the bottom and two side surfaces of an insert positioned therein, a clamping plate for clamping an insert in said insert site, a screw extending through said clamping plate into said holder shaft for pressing said plate against an insert in said insert site, said plate having two spaced apart insert contact surfaces on downwardly projecting portions thereof positioned over said insert site and adapted to engage an insert and means in addition to said screw for preventing lateral movement of said plate with respect to said insert site, said insert contact surfaces being placed adjacent the free end portions of said side surfaces.

10. A tool holder as defined in claim 9 in which one of said insert contact surfaces is positioned on a sidewardly projecting portion on said clamping plate extending along one of said side surfaces.

11. A tool holder and cutting insert combination comprising an insert having a substantially plane bottom surface, substantially plane side surfaces and a top surface, a cutting edge at the intersection of one of said side surfaces and said top surface, said top surface comprising a clamp contact surface adjacent to one end of said cutting edge and extending downwardly toward both said bottom surface and said one side surface and a second clamp contact surface spaced from said one clamp contact surface, said holder comprising a shaft having an insert site, said insert site having a bottom surface and side surfaces engaging the bottom surface and two adjacent side surfaces of said insert, a clamping plate, a screw holding said clamping plate against said insert and means other than said screw holding said clamping plate against laterial movement with respect to said insert site, said clamping plate having two spaced apart clamping areas engaging said clamp contact surfaces on said insert, said clamp contact surfaces being positioned adjacent the free ends of said side surfaces in said insert site.

References Cited by the Examiner
UNITED STATES PATENTS

| | | | |
|---|---|---|---|
| 2,537,837 | 1/51 | Labrozzi | 29—96 |
| 2,870,523 | 1/59 | Richard | 29—96 |
| 2,936,679 | 5/60 | Thuerwachter | 29—96 X |
| 3,040,632 | 6/62 | Walter | 29—97 X |

WILLIAM W. DYER, *Primary Examiner.*

UNITED STATES PATENT OFFICE
CERTIFICATE OF CORRECTION

Patent No. 3,156,032            November 10, 1964

Evert Gustav Lundgren

It is hereby certified that error appears in the above numbered patent requiring correction and that the said Letters Patent should read as corrected below.

Column 3, line 11, for "passes" read -- presses --.

Signed and sealed this 28th day of September 1965.

(SEAL)
Attest:

ERNEST W. SWIDER            EDWARD J. BRENNER
Attesting Officer            Commissioner of Patents